(12) United States Patent
Lesters (10) Patent No.: US 9,073,238 B2
(45) Date of Patent: Jul. 7, 2015

(54) PROCESS FOR ROCKWOOL DERIVATIVE BRIQUETTES

(71) Applicant: Francis A. Lesters, Naperville, IL (US)

(72) Inventor: Francis A. Lesters, Naperville, IL (US)

( * ) Notice: Subject to any disclaimer, the term of this patent is extended or adjusted under 35 U.S.C. 154(b) by 21 days.

(21) Appl. No.: 14/070,514

(22) Filed: Nov. 2, 2013

(65) Prior Publication Data

US 2014/0159272 A1  Jun. 12, 2014

Related U.S. Application Data

(60) Provisional application No. 61/721,759, filed on Nov. 2, 2012.

(51) Int. Cl.
| | |
|---|---|
| *B09B 3/00* | (2006.01) |
| *B65G 65/30* | (2006.01) |
| *B65G 69/10* | (2006.01) |
| *B29B 9/12* | (2006.01) |
| *C04B 18/00* | (2006.01) |

(52) U.S. Cl.
CPC ............... *B29B 9/12* (2013.01); *B09B 3/0025* (2013.01); *C04B 18/00* (2013.01)

(58) Field of Classification Search
None
See application file for complete search history.

(56) References Cited

U.S. PATENT DOCUMENTS

| | | | | | |
|---|---|---|---|---|---|
| 3,506,146 | A | * | 4/1970 | Parigot et al. | 414/800 |
| 3,581,920 | A | * | 6/1971 | Strocker et al. | 198/506 |
| 4,744,459 | A | * | 5/1988 | Ryan | 198/508 |
| 5,242,603 | A | * | 9/1993 | Fan | 405/129.25 |

* cited by examiner

*Primary Examiner* — Mary F Theisen
(74) *Attorney, Agent, or Firm* — Vincent Re PLLC (57) ABSTRACT

A process for reusing rockwool production by-product into marketable bricks is disclosed. The process includes, in a brick forming facility, sequentially dumping incoming rockwool production by-product in a mixing bunker in a first direction, acquiring the rockwool production by-product from the mixing bunker in a second direction, and forming bricks with the mixed rockwool production by-product. Acquiring the rockwool production by-product in the second direction mixes the rockwool production by-product from two non-sequential dumps.

11 Claims, 6 Drawing Sheets

PROCESS FOR ROCKWOOL DERIVATIVE BRIQUETTES

CROSS-REFERENCE TO RELATED APPLICATIONS

This disclosure claims the benefit of U.S. Provisional Application No. 61/721,759 filed on Nov. 2, 2012 which is hereby incorporated by reference.

TECHNICAL FIELD

This disclosure is related to a process for using a rockwool fine by-product know industry wide as shot in construction of a brick/briquette utilizing Portland Cement only or by adding other minerals for the purpose of agglomeration and reuse in the cupola furnace.

BACKGROUND

The statements in this section merely provide background information related to the present disclosure. Accordingly, such statements are not intended to constitute an admission of prior art.

The rockwool industry makes a wool product that is used for insulation purposes and for ceiling tile. In the process they produce a by-product called shot that has been used by the cement industry as filler in the past. However, costs, such as shipping costs, and small margins have led to an industry practice of simply dumping the shot at a disposal site.

SUMMARY

A process for reusing rockwool production by-product into marketable bricks is disclosed. The process includes, in a brick forming facility, sequentially dumping incoming rockwool production by-product in a mixing bunker in a first direction, acquiring the rockwool production by-product from the mixing bunker in a second direction, and forming bricks with the mixed rockwool production by-product. Acquiring the rockwool production by-product in the second direction mixes the rockwool production by-product from two non-sequential dumps.

BRIEF DESCRIPTION OF THE DRAWINGS

One or more embodiments will now be described, by way of example, with reference to the accompanying drawings, in which.

DETAILED DESCRIPTION

Referring now to the drawings, wherein the showings are for the purpose of illustrating certain exemplary embodiments only and not for the purpose of limiting the same, a process is disclosed in which the shot and other fine materials derived from the screening of the input minerals can be recycled by the method of agglomerating. The process includes locating manufacturing locations nearby the rockwool production facilities that have capabilities of making block, bricks, or briquettes. Blocks, bricks, and briquettes as described herein include similar embodiments of masonry products and are intended to be included interchangeably with any masonry products that can be created through agglomerating. According to one embodiment, a manufacturing location capable of making bricks or blocks is located that shares a transportation advantage with the rockwool production facility. Alternatively, such a transportation advantage can include locating the brick or block manufacturing facility along a truck route wherein excess capacity of the trucks to transport shot from the rockwool production facility to the brick or block manufacturing facility can be scheduled. This process can take advantage of a material blend formula using the rockwool plant waste materials and agglomerating them into bricks/briquettes.

An exemplary process of agglomeration is disclosed herein. The shot and other waste materials are collected by the rockwool production facility and maintained in a stockpile. The materials are then either screened or not screened depending upon the producers capabilities. If the screening is performed by the contractor at the site, a mechanical device is utilized that separates the material into an over 2" size and an under 2" size. This material is stored until convenient to truck to the nearby block or brick producer who will stockpile the materials in a configuration facilitating blending the received material and produce a homogenized product. A number of rockwool production by-products can be incorporated into bricks/briquettes according to the present disclosure, including shot and slag. The disclosure will refer in general to rockwool waste and shot, but it will be appreciated that slag and other similar by-products can similarly be utilized throughout the disclosure.

According to one embodiment for blending the shot and other raw materials, trucks can dump materials in first vertical configuration, with multiple parallel rows of raw materials, and then an excavator or front-loader can pick up the raw materials in a second horizontal configuration, thereby taking material simultaneously from the multiple rows.

If the separation is not performed at the producer's location then it must be done at the brick/briquette site and a stockpile blending method can be performed before the material is utilized by the brick or block producer. Once the material is blended, it can be taken by an endloader or excavator to a hopper that can have a feeder to release the material in a measured amount onto a conveyor. The conveyor transports the material to an overhead bin for the beginning of the production stage of agglomerating the blended materials. From the overhead bin the material is released by a feeder into a mixer capable of weighing each material before performing the mixing. In addition to the blended shot and waste from the rockwool plant, a recycled material having specific chemical properties that enhances the soon to be mixed materials is added. Further a binder is combined in the mixer with a measured amount of water and all the ingredients are mixed into an appropriate consistence and placed into the block or brick machine and made into an agglomerated brick/briquette. The brick or briquette is placed on a flat pan and then put on racks for further measured curing. Upon curing the rack is returned to the machine and placed on a conveyor belt that will remove the finished brick/briquette on a conveyor moving them outside of the building into a site of the brick or block producer. According to another embodiment, the brick/briquettes/blocks can be loaded onto a truck or rail car and transported back to the original rockwool production facility to be processed through a furnace at that site.

One exemplary process to process bricks or blocks at the rockwool producer is to blend a specified percentage of the brick/briquettes into the furnace/cupola. The producer benefits from not having to purchase slag which the brick/briquettes will replace and they benefit from not having to pay the trucking and tipping fees to dispose of the shot and other waste materials. There is also a benefit of a reduction in the coke required to melt the materials as the brick/briquettes melt faster. The ability to secure Leeds credit may also be a benefit for consideration.

Figure 1:
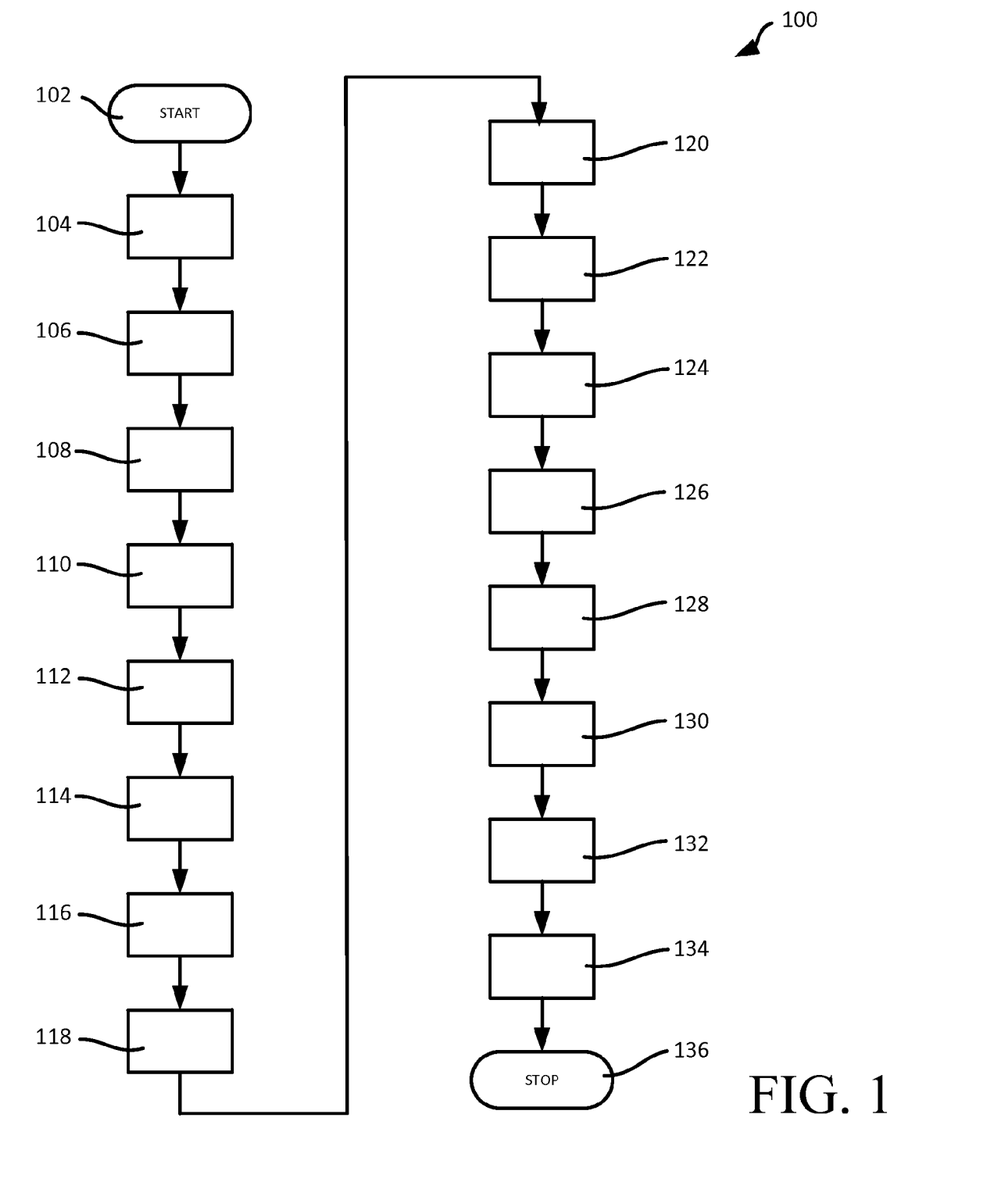
FIG. 1 illustrates an exemplary process for using shot in the formation of bricks, in accordance with the present disclosure.

FIG. 1 illustrates an exemplary process for using shot in the formation of bricks. Process 100 is provided as an exemplary process to achieve the disclosed formulation of bricks. It will be appreciated that this is intended to be a non-limiting example, and steps can be added, deleted, or replaced. Process 100 starts at step 102. At step 104, beginning at the industrial site where the shot is produced as a by-product of another process, rockwool waste shot is collected by the manufacturer in a dump area, and by truck, rail, or other transportation method, the shot is transported to the brick manufacture site. At step 106, at the brick manufacture site, loads of shot are dumped sequentially into a blending bunker. According to one dumping process, the loads of shot are dumped such that sequential dumps are lined up in a first direction. Such a line of dumped shot loads can arbitrarily be considered a column of shot dumps. Once a column of dumps is completed within the bunker, a new column of dumps can be started next to the first column of dumps. In this way, a blending bunker can be filled with sequential dumps being lined up in columns. In one exemplary embodiment, a first column could include dumps one to ten, a second column could include dumps eleven to eighteen, and a third column could include dumps nineteen to thirty. Dumps in neighboring columns can but need not be lined up aligned rows. A process is disclosed whereby an endloader or excavator, can acquire amounts of shot along a different direction than the first direction that the columns are formed in and aligned to. Such a different or second direction can but need not be a perpendicular direction to the first direction.

In the process of acquiring shot from a series of piles, an endloader or other vehicle will mix one dumped pile with a next dumped pile. By using an endloader acquiring shot along the second direction, piles of shot will be blended that were not sequentially dumped. Shot dumped in sequential piles can exhibit similar properties. In one example, size of particles in the shot can be similar if they were produced at a same facility under roughly the same conditions. This mixing of non-sequentially dumped piles of shot helps to create loads of shot with mixed properties, leading to improved homogenous properties in the shot used to make bricks. This improvement in the properties of the shot leads to improved homogenous properties and increased marketability of the resulting brick product.

In addition to dumping piles in columns and acquiring loads of shot in a perpendicular direction to the columns, other configurations are envisioned in accordance with the disclosed process. In another example, loads of shot can be acquired at a different angle from the column alignment, for example, at a 45 degree angle from the columns. In another example, instead of dumping the shot in straight columns, the shot could be dumped in a spiral configuration, and loads of shot could be acquired in a radial direction to the spiral shape to achieve the mixing of dumped shot piles disclosed herein. A number of exemplary dump and acquire patterns are envisioned, and the disclosure is not intended to be limited to the particular embodiments disclosed herein.

At step 108, once the blending bunker of step 106 is filled, subsequent loads of shot can be dumped into a second blending bunker. In the alternative to using a plurality of blending bunkers, different portions of a single blending bunker can be used to dump and then acquire loads of shot. Disclosure herein anticipates dumping of sequential loads of shot in successive columns in a first direction until a dumping area or mixing bunker is filled and then removing loads from that bunker after the bunker is filled. In another example, a running dump and acquire process could be operated in a single bunker area, wherein loads could be continually dumped in a first direction and loads of shot can be acquired by an endloader in a second direction.

At step 110, the endloader dumps loads of acquired mixed shot into a briquette plant hopper. Such a hopper can be a storage device known in the art for storing and later dispensing granularized or particulate material such as shot. At step 112, a product flow of mixed shot is dispensed from the hopper onto a conveyor for transport. At step 114, the shot is loaded from the conveyor into a briquette plant silo. At step 116, a flow of shot is metered from the silo and dispensed into a briquette mixing drum. The mixing drum is a device known in the art for combining flows or amounts of granularized or particulate matter into homogenized or semi-homogenized mixtures in preparation for being formed into bricks or briquettes. At step 118, the briquette mixing drum can weigh and mix the shot with cement and other products to achieve a desired mixture. In one example, a cement silo can be used to store, dispense, and meter cement into the mixing drum as desired. Once mixed by the mixing drum, at step 120, the mixture can stored in an elevator hopper. At step 122, an elevator track system known in the art can move and position the elevator hopper. At step 124, the elevator hopper dumps the mixture into a brick/briquette machine known in the art. At step 126, the mixture is formed into a predetermined shape or shapes with a mold loaded onto a pallet. Each pallet can include a plurality of molds. At step 128, a conveyor or series of conveyors are used to move the pallets to a loading area. At step 130, an exemplary forklift device can be used to acquire pallets and stack the pallets in a curing room storage area. At step 132, each pallet is held through a curing period, in one example, for twenty four hours. Such curing times depend upon the particular properties of the materials used in the mixture. At step 134, the pallets are manipulated such that the cured bricks are removed from the pallets and prepared for storage or shipment. At step 136, the process ends. Process 100 is provided as a non-limiting example of a process to form bricks from a series of dumped piles of shot.

Figure 2:
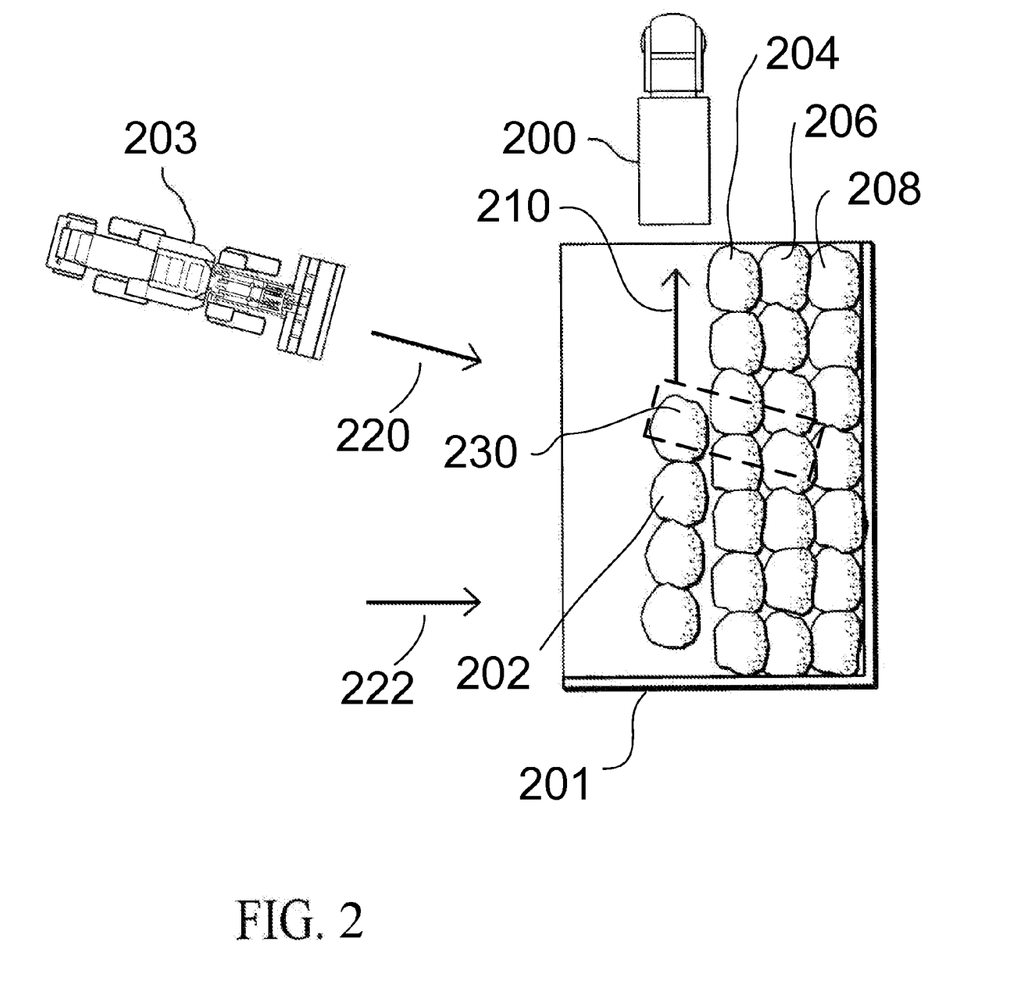
FIG. 2 illustrates an exemplary mixing bunker and operation of a truck dumping shot and an endloader acquiring a load of shot, in accordance with the present disclosure.

FIG. 2 illustrates an exemplary mixing bunker and operation of a truck dumping shot and an endloader acquiring a load of shot. Mixing bunker 201 is illustrated including a plurality of dumped loads of shot. Truck 200 is provided as an exemplary vehicle capable of unloading or dumping piles of shot within bunker 201. A number of different vehicles could be used to dump shot within the bunker, for example, with a different vehicle including an endloader removing shot from a railcar and sequentially dumping shot into the bunker. According to another example, instead of distinct piles being generated, another system or device could use a manipulated conveyor system to dump one long pile in place of a column of distinct piles in accordance with the present disclosure. Finished columns 204, 206, and 208 of shot piles are illustrated. In process column 202 is additionally illustrated, where truck 200 is completing column 202 by dumping piles in first direction 210. According to one exemplary process, the first pile dumped would be located at a lower right corner of bunker 201, and a last pile dumped would be located at an upper left corner of bunker 201. Endloader 203 is illustrated preparing to acquire a load of mixed shot. Endloader 203 could acquire shot along a second direction 222 oriented perpendicular to first direction 210. In the particular example of FIG. 2, endloader 203 is preparing to acquire shot along second direction 220 located at approximately a seventy degree angle to first direction 210. A resulting mixed load of shot would be collected from area 230 represented by a dotted box. By acquiring a load of shot along direction 220, endloader 203 acquires a mixture of shot that was dumped at different, non-sequential times or a mixture including non-sequential dumps of shot.

Figure 3A:
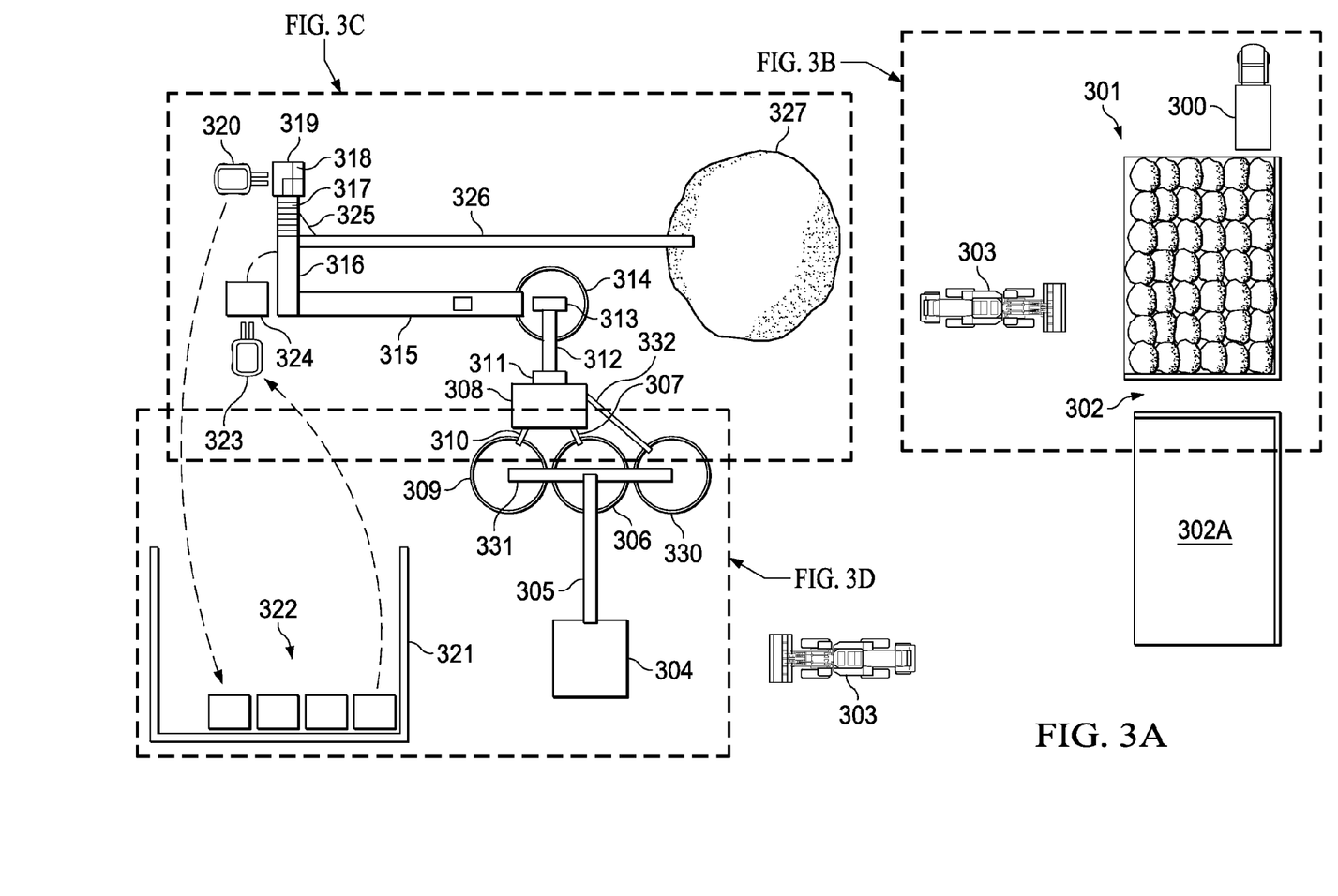
FIGS. 3A-3D schematically illustrate operation of the exemplary process of FIG. 1 including an exemplary layout to accomplish the disclosed method, in accordance with the present disclosure.
Figure 3B:
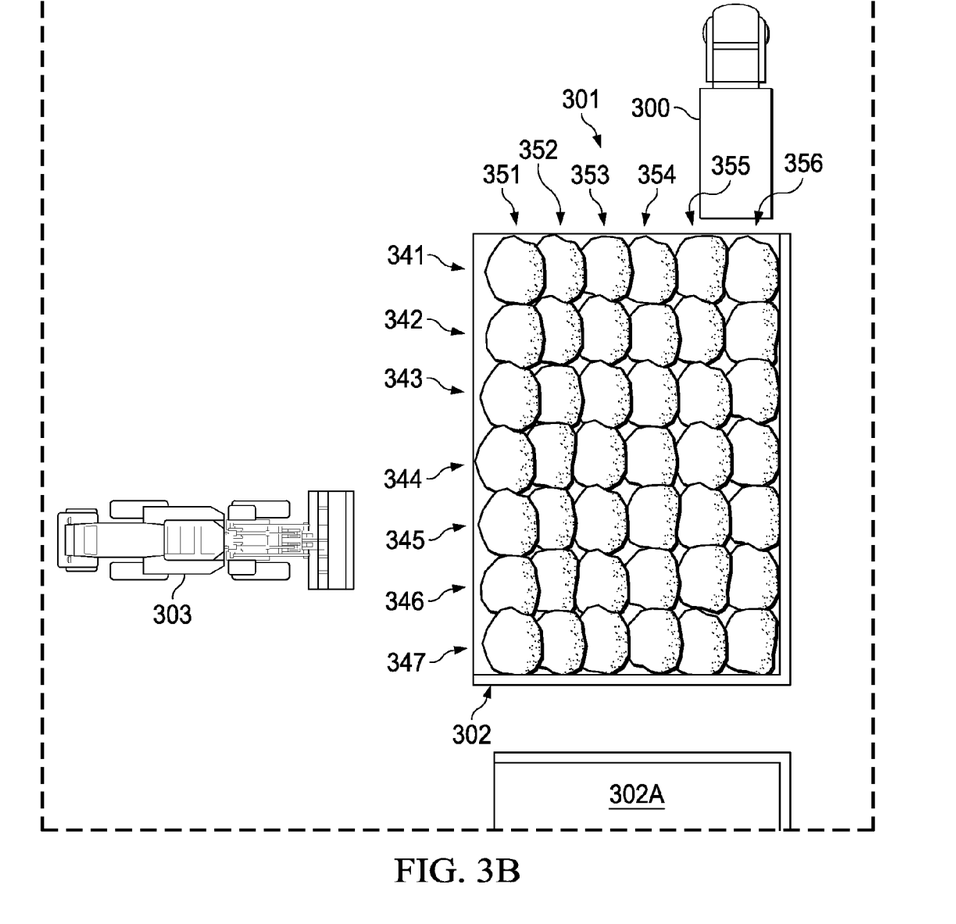
Figure 3C:
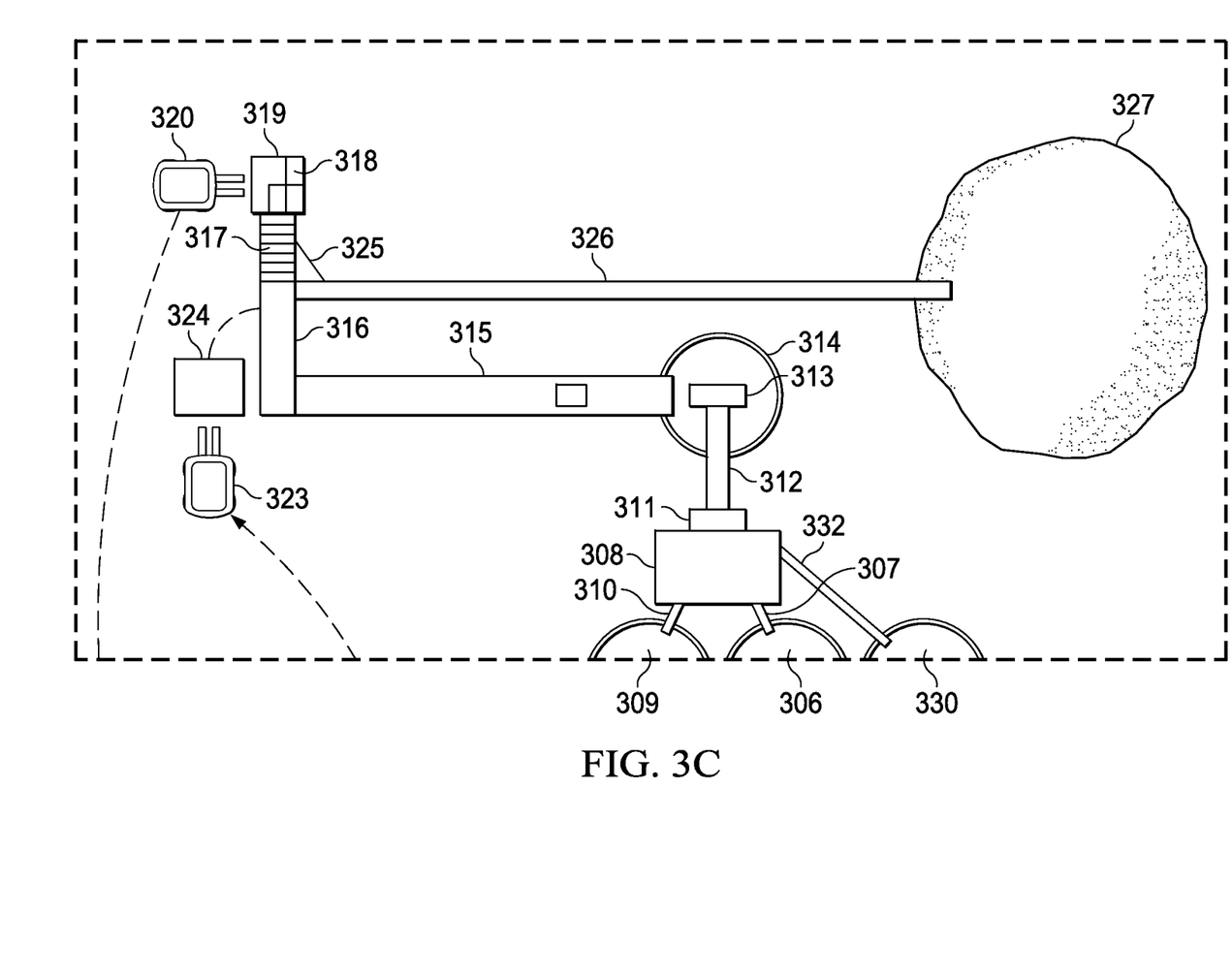
Figure 3D:
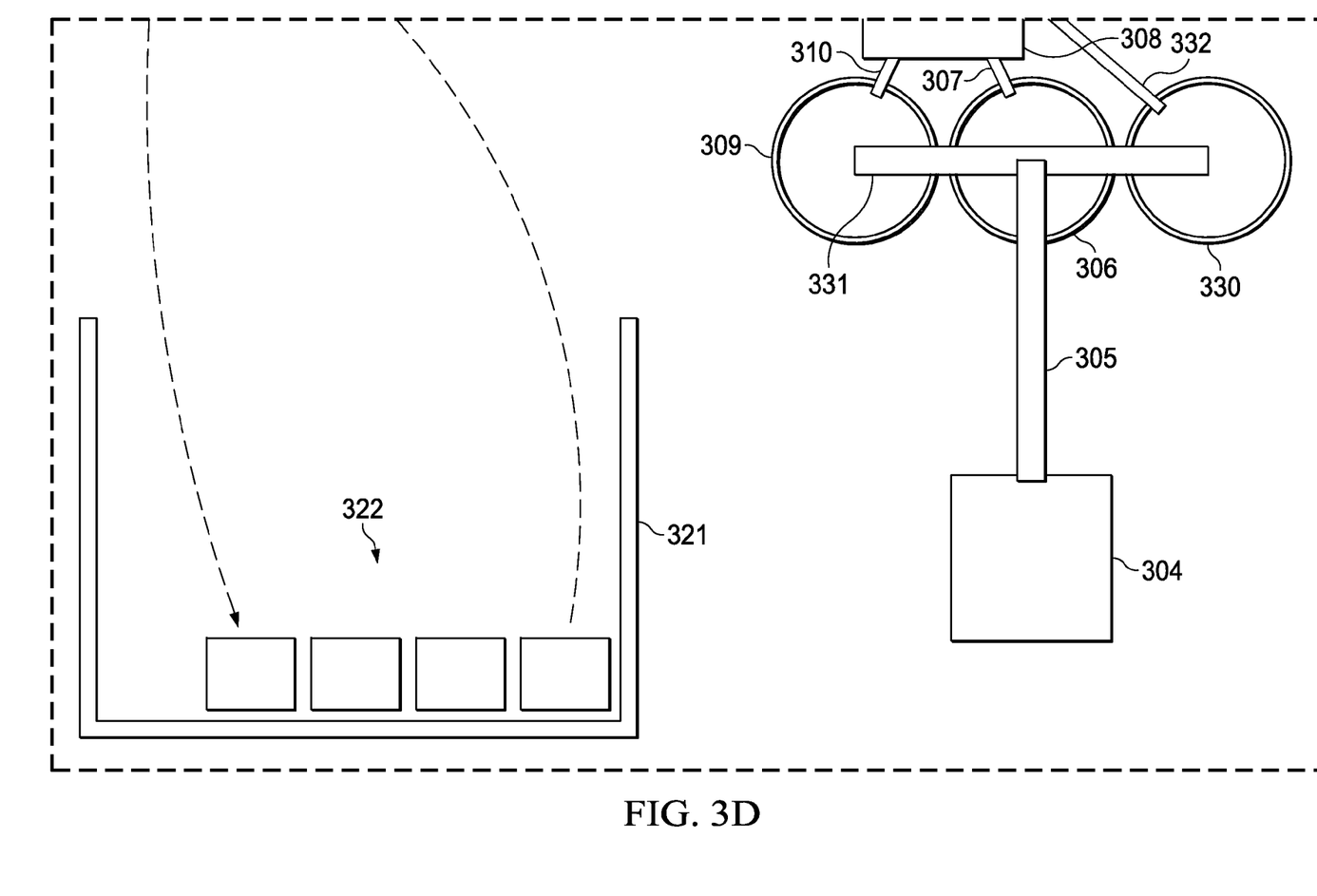

FIGS. 3A-3D schematically illustrate operation of the exemplary process of FIGS. 1A and 1B including an exemplary layout to accomplish the disclosed method. FIG. 3A illustrates in overview the exemplary layout. FIG. 3B focuses upon the bunkers used to blend the incoming truckloads of shot. FIGS. 3C and 3D focus on a remainder of the disclosed process of FIG. 1.

As illustrated in FIGS. 3A-3D, a pair of mixing bunkers 302 and 302A are illustrated. Bunker 302 has recently been filled by truck 300 dumping a plurality of piles of shot in a first direction. Excavator 303 is illustrated preparing to acquire a load of shot in a second direction. According to the exemplary illustration of FIG. 3B, the first direction can be oriented vertically in the illustration, and the second direction can be oriented horizontally across the illustration. In another embodiment, wherein, for example, the bunker is enclosed on three sides by a wall such that both the truck and the excavator must approach the bunker from the same open end, the process disclosed could be achieved by truck 300 dumping piles in rows across the bunker parallel to the open end of the bunker and by the excavator acquiring loads of shot perpendicular to the open end of the bunker.

FIG. 3B illustrates rectangular bunker 302 and bunker 302A. Bunker 302 includes walls along two sides and open sides along two other sides. Bunker 302 includes piles of shot 301 including columns 351, 352, 353, 354, 355, and 356 aligned vertically according to a first direction in which truck 300 sequentially dumped the piles and rows 341, 342, 343, 344, 345, 346, and 347 wherein the piles are optionally aligned according to a first pile dumped in a respective column, the second pile dumped in a respective column, etc. Exemplary bunker 302 includes walls along two sides of the bunker, permitting a truck to enter the bunker from the first direction and the excavator to enter the bunker from the second direction. As excavator 303 acquires loads of shot along a second direction, different and misaligned from the first direction, shot from neighboring columns is mixed according to the process disclosed herein.

FIG. 3D illustrates briquette plant hopper 304 receiving mixed shot from excavator 303 and conveyor 305 transporting material from hopper 304 to one of silo 306 or conveyor 331. Silo 306 is configured to hold mixed shot as disclosed herein. In one exemplary process, hopper 304 and conveyor 305 can additionally be used to transport other materials such as cement to silos 309 and 330 by operation of conveyor 331. Conveyors 307, 310, and 332 are configured to receive material from silos 306, 309, 330, respectively, and transfer the materials to mixing drum/weighing hopper 308.

FIG. 3C illustrates mixing drum/weighing hopper 308 receiving materials from silos 306, 309, and 330 by operation of conveyors 307, 310, and 332, respectively. Mixed material or the mixture from hopper 308 is transferred to elevator hopper 311. Elevator track system 112 moves and positions hopper 311 into position 313, whereat the mixture is dumped into brick/briquette machine 314. Brick/briquette machine 314 transforms the ingredients into a desired brick shape by way of a mold. Formed mixture shaped as not-yet-cured bricks are transferred to or created upon a series or plurality of pallets. Pallet conveyor 315 transfers the pallets from machine 314 to a transfer conveyor 316, which redirects the pallets to roller conveyor 317. Rack 319 includes rack holding fixtures 318 and is configured to receive and securely hold pallets from roller conveyor 317. Forklift 320 acquires rack 319 and moves the rack to a curing area 321, illustrated in FIG. 3D. As the racks stay in curing area 321 for a specified time, they become racks of cured bricks 322. Forklift 323 can be used to move racks of cured bricks 322 back to transfer conveyor of FIG. 3C, whereat a swivel gate 325 can be used to transfer bricks to finished brick/briquette conveyor 326. The finished bricks are conveyed to and stored at stockpile 327. The illustrated configuration of FIGS. 3A-3D are exemplary, and sub-processes and equipment can be adjusted from the illustrated configuration according to the disclosed process.

A number of brick compositions are capable of being produced according to the disclosed process. A first non-limiting example of a brick product can include 57.5% granulated, pelletized, or air cooled slag, 17.5% recycled clay brick chips, 5.0% soda ash, 10.0% recycled silica glass chips/flour, and 10.0% Portland Cement binder. A second non-limiting example of a brick product can include a mixture of 90% recycled rockwool waste or shot and 10% Portland Cement binder. A third non-limiting example of a brick product can include a mixture of 80% recycled rockwool waste or shot, 10% recycled clay brick chips, and 10% Portland Cement binder. In one embodiment, a brick mixture is disclosed including at least 10% cement binder and at least 50% rockwool waste material. A number of alternative mixture percentages or additional or replacement components are envisioned, and the disclosure is not intended to be limited to the particular examples provided herein.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A process for reusing rockwool production by-product, the process comprising:
   in a brick forming facility, sequentially dumping incoming rockwool production by-product in a mixing bunker in a first direction;
   acquiring the rockwool production by-product from the mixing bunker in a second direction, wherein the acquiring mixes the rockwool production by-product from two non-sequential dumps; and
   forming bricks with the mixed rockwool production by-product.

2. The process of claim 1, wherein the rockwool production by-product comprises rockwool waste comprising shot.

3. The process of claim 2, wherein the brick forming facility is located proximately to a rockwool production facility.

4. The process of claim 2, wherein sequentially dumping the incoming rockwool waste comprises dumping the rockwool waste sequentially in a first column; and upon completion of the first column, dumping the rockwool waste sequentially in a second column located next to the first column.

5. The process of claim 2, wherein sequentially dumping the incoming rockwool waste comprises dumping the rockwool waste sequentially in a first column; and
subsequent to completion of the first column, dumping the rockwool waste sequentially in a plurality of successive columns located next to the first column.

6. The process of claim 2, wherein acquiring the rockwool waste from the mixing bunker in the second direction comprises acquiring the rockwool waste in the second direction oriented perpendicularly to the first direction.

7. The process of claim 2, wherein the rockwool waste is combined with a Portland Cement binder and permitted to cure into finished bricks.

8. The process of claim 7, wherein the rockwool waste is further combined with recycled clay brick chips.

9. The process of claim 8, wherein the bricks include eighty percent composition of the rockwool waste, ten percent composition of the recycled clay brick chips, and ten percent composition of the Portland Cement binder.

10. The process of claim 7, wherein the bricks include ninety percent composition of the rockwool waste, and ten percent composition of the Portland Cement binder.

11. The process of claim 1, wherein the bricks include 57.5% composition of slag, 17.5% composition of recycled clay brick chips, 5.0% composition of soda ash, 10.0% composition of recycled silica glass, and 10.0% composition of the Portland Cement binder.

* * * * *